United States Patent
Kulesza et al.

(10) Patent No.: US 10,318,572 B2
(45) Date of Patent: Jun. 11, 2019

(54) STRUCTURED LABELING TO FACILITATE CONCEPT EVOLUTION IN MACHINE LEARNING

(71) Applicant: MICROSOFT CORPORATION, Redmond, WA (US)

(72) Inventors: Todd Kulesza, Corvallis, OR (US); Denis Charles, Redmond, WA (US); Rich Caruana, Woodinville, WA (US); Saleema Amin Amershi, Seattle, WA (US); Danyel Aharon Fisher, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 335 days.

(21) Appl. No.: 14/176,990

(22) Filed: Feb. 10, 2014

(65) Prior Publication Data
US 2015/0227531 A1    Aug. 13, 2015

(51) Int. Cl.
G06F 16/28 (2019.01)
G06F 16/35 (2019.01)
(Continued)

(52) U.S. Cl.
CPC ............ G06F 16/44 (2019.01); G06F 3/0482 (2013.01); G06F 3/0486 (2013.01);
(Continued)

(58) Field of Classification Search
CPC .......... G06F 17/30864; G06F 3/04842; G06F 3/0482; G06F 11/0709; G06F 11/1435; G06F 17/30477; G06F 17/3089; G06F 17/30867; G06F 17/30699; G06F 17/30722; G06F 17/30038; G06F 17/3084; G06F 3/04817; G06F 3/0486; G06F 17/30265;
(Continued)

(56) References Cited

U.S. PATENT DOCUMENTS 5,239,596 A * 8/1993 Mahoney ............. G06K 9/4638
382/180
5,418,942 A * 5/1995 Krawchuk ........ G06F 17/30011
(Continued)

OTHER PUBLICATIONS

Wei, et al., "Interactive Machine Learning (IML) Markup of OCR Generated Text by Exploiting Domain Knowledge: A Biodiversity Case Study", In the Conference Poster, Feb. 2008, 5 pages.
(Continued)

*Primary Examiner* — Ryan F Pitaro
*Assistant Examiner* — Carl P Lobo
(74) *Attorney, Agent, or Firm* — Shook, Hardy & Bacon L.L.P.

(57) ABSTRACT

A system, method, and media are provided for generating a structured labeling graphical user interface. The user interface receives user input that associates multimedia content with categories. The user input may include user-supplied tags that further define the category for the multimedia content. The user-supplied tags are rendered proximate to the categories. In turn, a database logs user events to store, among other things, the categories, the user-supplied tags, time associated with completing the user-supplied tags, and time for associating multimedia content with the categories or tags.

20 Claims, 7 Drawing Sheets

(51) Int. Cl.
*G06F 16/44* (2019.01)
*G06F 3/0481* (2013.01)
*G06F 3/0482* (2013.01)
*G06F 3/0486* (2013.01)

(52) U.S. Cl.
CPC ........ *G06F 3/04817* (2013.01); *G06F 16/287* (2019.01); *G06F 16/358* (2019.01)

(58) Field of Classification Search
CPC ......... G06F 17/30029; G06F 17/30958; G06F 17/30058; G06F 17/30312; G06F 17/30017; G06F 17/30244; G06F 17/3053; G06F 17/30412; G06F 7/24; G06F 17/30598; G06F 3/0481; G06F 17/3028; G06F 19/00; G06F 17/30528; G06F 17/30557; G06F 17/30572; G06F 19/24; G06F 21/552; G06F 15/18; G06F 17/30; G06F 17/30554; G06F 21/316; G06F 17/2785; G06F 17/30967; G06F 19/707; G06F 8/38; G06F 17/30616; G06F 17/30389; G06F 17/30401; G06F 17/30424; G06F 17/30663; G06F 17/30669; G06F 17/2775; G06F 17/3069; G06F 17/30705; G06F 17/30525; G06F 17/30569; G06F 17/30687; G06F 17/30734; G06F 17/30917; G06F 17/20; G06F 19/18; H04L 63/102
See application file for complete search history.

(56) References Cited

U.S. PATENT DOCUMENTS

| | | | | |
|---|---|---|---|---|
| 6,266,649 | B1* | 7/2001 | Linden | G06Q 10/08345 705/14.51 |
| 6,581,068 | B1* | 6/2003 | Bensoussan | G06F 17/30457 |
| 6,847,972 | B1 | 1/2005 | Vernau et al. | |
| 6,940,509 | B1 | 9/2005 | Crow et al. | |
| 7,062,561 | B1* | 6/2006 | Reisman | G06F 17/30 707/E17.109 |
| 7,421,441 | B1* | 9/2008 | Chan | G06F 17/30864 |
| 7,725,414 | B2 | 5/2010 | Nigam et al. | |
| 7,793,212 | B2* | 9/2010 | Adams, Jr. | G06F 17/241 715/203 |
| 8,001,003 | B1* | 8/2011 | Robinson | G06Q 30/0201 705/14.53 |
| 8,086,549 | B2 | 12/2011 | Qi et al. | |
| 8,126,912 | B2* | 2/2012 | King | G06F 17/30038 706/45 |
| 8,190,604 | B2 | 5/2012 | Wen et al. | |
| 8,201,073 | B2* | 6/2012 | Canora | G11B 27/034 715/201 |
| 8,370,357 | B1 | 2/2013 | Gudmundsson | G06Q 30/0603 707/737 |
| 8,433,993 | B2* | 4/2013 | Weinberger | G06F 17/30053 715/202 |
| 8,566,329 | B1* | 10/2013 | Freed | G06F 17/3053 707/748 |
| 8,732,175 | B2* | 5/2014 | Butterfield | G06F 17/30265 707/748 |
| 8,819,024 | B1* | 8/2014 | Toderici | G06F 17/30731 707/740 |
| 8,909,950 | B1* | 12/2014 | Levchuk | H04W 52/223 455/418 |
| 8,996,350 | B1* | 3/2015 | Dub | G06F 17/30011 704/1 |
| 9,471,671 | B1* | 10/2016 | Juang | G06F 17/3053 |
| 2002/0069192 | A1* | 6/2002 | Aegerter | G06F 17/30557 |
| 2003/0033370 | A1* | 2/2003 | Trotta | G06F 17/30867 709/204 |
| 2003/0050805 | A1* | 3/2003 | Gouyet | G06Q 10/02 705/5 |
| 2003/0050923 | A1* | 3/2003 | Chang | G06F 17/30967 |
| 2003/0060284 | A1* | 3/2003 | Hamalainen | G09B 7/02 463/42 |
| 2003/0206203 | A1* | 11/2003 | Ly | G06Q 10/10 715/853 |
| 2003/0210278 | A1* | 11/2003 | Kyoya | G06F 3/0481 715/810 |
| 2003/0212585 | A1* | 11/2003 | Kyoya | G06Q 10/0637 705/7.36 |
| 2003/0217335 | A1* | 11/2003 | Chung | G06F 17/2785 715/206 |
| 2003/0227487 | A1* | 12/2003 | Hugh | G06F 17/30958 715/777 |
| 2004/0111432 | A1* | 6/2004 | Adams, Jr. | G06F 17/30256 |
| 2004/0125405 | A1* | 7/2004 | Salomon | G06Q 10/00 358/1.18 |
| 2004/0205482 | A1* | 10/2004 | Basu | G06F 17/241 715/201 |
| 2005/0010589 | A1* | 1/2005 | Novak | G06F 17/30749 |
| 2005/0097008 | A1* | 5/2005 | Ehring | G06F 17/211 715/205 |
| 2005/0216457 | A1* | 9/2005 | Walther | G06F 17/30696 |
| 2005/0256866 | A1* | 11/2005 | Lu | G06F 17/30867 |
| 2005/0289163 | A1* | 12/2005 | Gordon | G06F 17/30038 |
| 2006/0041548 | A1* | 2/2006 | Parsons | G06F 17/30873 |
| 2006/0173985 | A1* | 8/2006 | Moore | G06F 17/3089 709/223 |
| 2006/0242554 | A1* | 10/2006 | Gerace | G06F 17/30867 715/209 |
| 2006/0282776 | A1* | 12/2006 | Farmer | G11B 27/34 715/719 |
| 2007/0038938 | A1* | 2/2007 | Canora | G11B 27/034 715/731 |
| 2007/0055655 | A1* | 3/2007 | Bernstein | G06F 17/30292 |
| 2007/0067293 | A1* | 3/2007 | Yu | G06F 17/30687 |
| 2007/0083894 | A1* | 4/2007 | Gonsalves | G06F 17/3089 725/46 |
| 2007/0118802 | A1* | 5/2007 | Gerace | G06F 17/30867 715/738 |
| 2007/0127834 | A1* | 6/2007 | Lee | G06K 9/38 382/254 |
| 2007/0136267 | A1* | 6/2007 | Hess | G06F 17/30528 |
| 2007/0219945 | A1* | 9/2007 | Wang | G06F 17/272 |
| 2007/0255742 | A1* | 11/2007 | Perez | G06F 17/30713 |
| 2008/0034329 | A1* | 2/2008 | Posner | G06F 9/4446 715/856 |
| 2008/0082298 | A1* | 4/2008 | Sjolander | G06F 17/30011 702/187 |
| 2008/0082941 | A1* | 4/2008 | Goldberg | G06F 3/0482 715/810 |
| 2008/0086484 | A1* | 4/2008 | Darnell | G06F 17/3089 |
| 2008/0086755 | A1* | 4/2008 | Darnell | H04N 5/44543 725/105 |
| 2008/0120501 | A1* | 5/2008 | Jannink | G06F 17/30017 713/163 |
| 2008/0172413 | A1* | 7/2008 | Chiu | G06F 17/30053 |
| 2008/0189336 | A1* | 8/2008 | Prihodko | G06F 17/30244 |
| 2008/0201314 | A1* | 8/2008 | Smith | G06F 17/30017 |
| 2008/0228928 | A1* | 9/2008 | Donelli | G06F 17/30029 709/228 |
| 2008/0235289 | A1* | 9/2008 | Carnes | G06F 17/30896 |
| 2008/0281764 | A1* | 11/2008 | Baxter | G06K 9/6256 706/12 |
| 2008/0281810 | A1* | 11/2008 | Smyth | G06F 17/30864 |
| 2008/0288596 | A1* | 11/2008 | Smith | G06Q 30/02 709/206 |
| 2009/0006335 | A1* | 1/2009 | Prager | H04L 67/06 |
| 2009/0132459 | A1* | 5/2009 | Hicks | G06N 5/02 706/52 |
| 2009/0193096 | A1* | 7/2009 | Boyer | G06F 17/3089 709/217 |
| 2009/0217149 | A1* | 8/2009 | Kamien | G06F 17/30038 715/230 |
| 2009/0222551 | A1* | 9/2009 | Neely | G06Q 30/02 709/224 |
| 2009/0240674 | A1* | 9/2009 | Wilde | G06F 17/30899 |
| 2009/0240683 | A1* | 9/2009 | Lazier | G06F 17/30864 |

(56) References Cited

U.S. PATENT DOCUMENTS

| | | | | |
|---|---|---|---|---|
| 2009/0240692 | A1* | 9/2009 | Barton | G06F 17/3082 |
| 2009/0265631 | A1* | 10/2009 | Sigurbjornsson | G06Q 10/10 |
| | | | | 715/716 |
| 2009/0319518 | A1* | 12/2009 | Koudas | G06F 17/30696 |
| 2009/0327243 | A1* | 12/2009 | Pradhan | G06F 17/30699 |
| 2010/0125576 | A1* | 5/2010 | Sehyun | G06F 17/30029 |
| | | | | 707/732 |
| 2010/0169243 | A1 | 7/2010 | Su et al. | |
| 2010/0191582 | A1* | 7/2010 | Dicker | G06Q 30/02 |
| | | | | 705/14.51 |
| 2010/0274667 | A1* | 10/2010 | Lanham | G06F 17/30026 |
| | | | | 705/14.49 |
| 2010/0318846 | A1 | 12/2010 | Sailer et al. | |
| 2011/0010364 | A1* | 1/2011 | Ahtisaari | G06F 17/30867 |
| | | | | 707/724 |
| 2011/0061068 | A1* | 3/2011 | Ali | G06Q 30/0241 |
| | | | | 725/9 |
| 2011/0131299 | A1* | 6/2011 | Sardary | G11B 27/034 |
| | | | | 709/219 |
| 2011/0161814 | A1* | 6/2011 | Kim | H04N 5/44543 |
| | | | | 715/716 |
| 2011/0173141 | A1* | 7/2011 | Campbell | G06F 17/30038 |
| | | | | 706/12 |
| 2011/0225162 | A1* | 9/2011 | Lyon | G06F 17/241 |
| | | | | 707/740 |
| 2011/0238495 | A1* | 9/2011 | Kang | G06Q 30/02 |
| | | | | 705/14.49 |
| 2011/0302163 | A1* | 12/2011 | Rhinelander | G06F 17/30598 |
| | | | | 707/737 |
| 2012/0030161 | A1* | 2/2012 | Kawai | G06F 17/30734 |
| | | | | 706/48 |
| 2012/0066233 | A1* | 3/2012 | Fonseka | G06F 17/30864 |
| | | | | 707/749 |
| 2012/0158638 | A1* | 6/2012 | Churchill | G06Q 10/00 |
| | | | | 706/52 |
| 2012/0158935 | A1* | 6/2012 | Kishimoto | G06Q 50/01 |
| | | | | 709/223 |
| 2012/0210247 | A1* | 8/2012 | Khouri | G06Q 10/101 |
| | | | | 715/751 |
| 2012/0233567 | A1* | 9/2012 | Brown | G06F 9/445 |
| | | | | 715/810 |
| 2012/0254804 | A1* | 10/2012 | Sheha | G06Q 30/02 |
| | | | | 715/834 |
| 2012/0272171 | A1* | 10/2012 | Icho | G06F 17/30032 |
| | | | | 715/771 |
| 2012/0287152 | A1* | 11/2012 | Kunigita | G06T 3/40 |
| | | | | 345/628 |
| 2012/0303637 | A1* | 11/2012 | Carmel | G06F 17/241 |
| | | | | 707/749 |
| 2013/0060785 | A1* | 3/2013 | Sweeney | G06N 5/00 |
| | | | | 707/748 |
| 2013/0066864 | A1* | 3/2013 | Rose | G06F 3/048 |
| | | | | 707/732 |
| 2013/0097172 | A1* | 4/2013 | McIntosh | G06F 17/30038 |
| | | | | 707/741 |
| 2013/0124963 | A1* | 5/2013 | Hatwich | G06F 17/241 |
| | | | | 715/230 |
| 2013/0151940 | A1* | 6/2013 | Bailor | G06F 17/24 |
| | | | | 715/229 |
| 2013/0198609 | A1* | 8/2013 | Mokhtarzada | G06F 3/048 |
| | | | | 715/234 |
| 2013/0212060 | A1* | 8/2013 | Crouse | G06F 17/30563 |
| | | | | 707/602 |
| 2013/0311485 | A1* | 11/2013 | Khan | G06F 17/2785 |
| | | | | 707/748 |
| 2013/0339362 | A1* | 12/2013 | Yang | G06F 17/30017 |
| | | | | 707/738 |
| 2013/0342566 | A1* | 12/2013 | Shin | G09G 5/377 |
| | | | | 345/629 |
| 2014/0006930 | A1* | 1/2014 | Hollis | G06F 17/2247 |
| | | | | 715/234 |
| 2014/0031086 | A1* | 1/2014 | Yoo | H04M 1/72519 |
| | | | | 455/566 |
| 2014/0040232 | A1* | 2/2014 | Raichelgauz | G06F 17/30038 |
| | | | | 707/708 |
| 2014/0082525 | A1* | 3/2014 | Kass | H04L 65/403 |
| | | | | 715/753 |
| 2014/0164507 | A1* | 6/2014 | Tesch | H04L 51/10 |
| | | | | 709/204 |

OTHER PUBLICATIONS

Osmanbeyoglu, et al. "Active Machine Learning for Transmembrane Helix Prediction", In Proceeding of the Eighth Asia Pacific Bioinformatics Conference, Jan. 18, 2010, 9 pages.

Amershi, et al., "CueT: Human-Guided Fast and Accurate Network Alarm Triage", In Proceedings of the SIGCHI Conference on Human Factors in Computing Systems, May 7, 2011, 10 pages.

Basu, et al., "Assisting Users with Clustering Tasks by Combining Metric Learning and Classification", In Proceedings of the Twenty-Fourth Conference on Artificial Intelligence, Jul. 2010, 7 pages.

Bennett, et al., "Learning Consensus Opinion: Mining Data from a Labeling Game", In Proceedings of the 18th International Conference on World Wide Web, Apr. 20, 2009, 10 pages.

Billsus, et al., "A Hybrid User Model for News Story Classification", In Proceedings of the Seventh International Conference on User Modeling, Jun. 20, 1999, 10 pages.

Blackwell, Alan F., "First Steps in Programming: A Rationale for Attention Investment Models", In Proceedings of the IEEE Symposia on Human Centric Computing Languages and Environments, Sep. 2002, 9 pages.

Borlund, Pia, "The Concept of Relevance in IR", In Journal of the American Society for Information Science and Technology, vol. 54 Issue 10, Aug. 2003, 13 pages.

Brain, et al., "On the Effect of Data Set Size on Bias and Variance in Classification Learning", In Proceedings of the Fourth Australian Knowledge Acquisition Workshop, Dec. 5, 1999, 12 pages.

Brodley, et al., "Identifying Mislabeled Training Data", In Journal of Artificial Intelligence Research, Aug. 1999, 37 pages.

Bshouty, et al., "PAC Learning with Nasty Noise", In Theoretical Computer Science, vol. 288, Issue 2, Oct. 16, 2002, 18 pages.

Carterette, et al., "Here or There", In Advances in Information Retrieval, Mar. 30, 2008, 13 pages.

Cunningham, et al., "A Case-Based Approach to Spam Filtering that can Track Concept Drift", In 5th International Conference on Case-Based Reasoning, Jun. 23, 2003, 9 pages.

Czerwinski, et al., "Visualizing Implicit Queries for Information Management and Retrieval", In Proceedings of the SIGCHI Conference on Human Factors in Computing Systems, May 15, 1999, 8 pages.

Gabrilovich, et al., "NewsJunkie: Providing Personalized Newsfeeds via Analysis of Information Novelty", In Proceedings of the 13th International Conference on World Wide Web, May 17, 2004, 9 pages.

"Search Quality Rating Guidelines", Published Date: Nov. 2, 2012, Available at: http://google.com/insidesearch/howsearchworks/assets/searchqualityevaluatorguidelines.pdf.

Kotsiantis, S. B., "Supervised Machine Learning: A Review of Classification Techniques", In the Informatica, Jul. 17, 2007, 20 pages.

Law, et al., "Learning to Tag using Noisy Labels", In European Conference on Machine Learning, Sep. 20, 2010, 29 pages.

McGee, Matt, "Yes, Bing Has Human Search Quality Raters & Here's How They Judge Web Pages", Published on: Aug. 15, 2012, Available at: http://searchengineland.com/bing-search-quality-rating-guidelines-130592.

Paul, et al., "Sensemaking in Collaborative Web Search", In Human Computer Interaction, vol. 26, Issue 1-2, Mar. 16, 2011, 66 pages.

Russell, et al., "The Cost Structure of Sensemaking", In Proceedings of the Interact and Conference on Human Factors in Computing Systems, Apr. 24, 1993, 8 pages.

(56) References Cited

OTHER PUBLICATIONS

Robertson, et al., "Data Mountain: Using Spatial Memory for Document Management", In Proceedings of the 11th Annual ACM Symposium on User Interface Software and Technology, Nov. 1, 1998, 10 pages.
Santos, et al., "On the Use of the Adjusted Rand Index as a Metric for Evaluating Supervised Classification", In Artificial Neural Networks—ICANN, Sep. 14, 2009, 10 pages.
Sheng, et., "Get Another Label? Improving Data Quality and Data Mining using Multiple, Noisy Labelers", In Proceedings of the 14th ACM SIGKDD International Conference on Knowledge Discovery and Data Mining, Aug. 24, 2008, 9 pages.
Stanley, Kenneth O., "Learning Concept Drift with a Committee of Decision Trees", In Technical Report Informe Tecnico UT-AI-TR-03-302, Retrieved Date: Dec. 10, 2013, 14 pages.
Teevan, et al., "Visual Snippets: Summarizing Web Pages for Search and Revisitation", In Proceedings of the SIGCHI Conference on Human Factors in Computing Systems, Apr. 9, 2009, 10 pages.
Tsymbal, Alexey, "The Problem of Concept Drift: Definitions and Related Work", In Technical Report TCD-CS-2004-15, Apr. 29, 2004, 7 pages.
Valiant, L. G., "Learning Disjunction of Conjunctions", In Proceedings of the 9th International Joint Conference on Artificial Intelligence—vol. 1, Aug. 1985, 7 pages.
"About the Music Genome Project", Retrieved on: Dec. 10, 2013, Available at: http://pandora.com/mgp.
Whittaker, et al., "The Character, Value, and Management of Personal Paper Archives", In ACM Transactions on Computer-Human Interaction, vol. 8, Issue 2, Jun. 2001, 21 pages.
Widmer, et al., "Learning in the Presence of Concept Drift and Hidden Contexts", In Journal Machine Learning, vol. 23, Issue 1, Apr. 1996, 34 pages.
Yih, et al., "Similarity Models for AD Relevance Measures", In NIPS Workshop: Machine Learning in Online Advertising, Dec. 10, 2010, 7 pages.
Yoshii, et al., "An Efficient Hybrid Music Recommender System using an Incrementally Trainable Probabilistic Generative Model", In IEEE Transactions on Audio, Speech, and Language Processing, vol. 16, Issue 2, Feb. 2008, 13 pages.
U.S. Appl. No. 14/075,713, Grangier, et al., "Interactive Segment Extraction in Computer-Human Interactive Learning", filed Nov. 8, 2013.
U.S. Appl. No. 14/075,701, Simard, et al., "Feature Completion in Computer-Human Interactive Learning", filed Nov. 8, 2013.
U.S. Appl. No. 14/075,690, Bottou, et al., "Active Labeling for Computer-Human Interactive Learning", filed Nov. 8, 2013.
U.S. Appl. No. 61/845,844, Lakshmiratan et al., "Computer-Human Interactive Learning", filed Jul. 12, 2013.
U.S. Appl. No. 14/075,679, Simard et al., "Interactive Concept Editing in Computer-Human Interactive Learning", filed Nov. 8, 2013.
"International Search Report & Written Opinion Received for PCT Patent Application No. PCT/US2015/014344", dated May 21, 2015, 11 Pages.
"International Preliminary Report on Patentability Issued in PCT Application No. PCT/US2015/014344", dated Apr. 22, 2016, 8 Pages.
"Second Written Opinion Issued in PCT Application No. PCT/US2015/014344", dated Jan. 21, 2016, 7 Pages.
"How to Use the Facebook "Like" Button", Retrieved from <<http://www.adsforfacebook.com/the-facebook-like-button.php>>, Jan. 27, 2012, 2 Pages.
Amershi, et al., "Power to the People: The Role of Humans in Interactive Machine Learning", In Publication of AI Magazine, vol. 35, Issue 4, Dec. 22, 2014, 21 Pages.
Conway, et al., "Machine Learning for Email: Spam Filtering and Priority Inbox", In Proceedings of O'Reilly Media, Oct. 2011, 3 Pages.
Hubert, et al., "Comparing partitions", In Journal of Classification 2(1):193-218, Dec. 1985, 2 Pages.
Kulesza, et al., "Structured Labeling to Facilitate Concept Evolution in Machine Learning", In Proceedings of the Conference on Human Factors in Computing Systems (CHI 2014), May 1, 2014, 10 Pages.
McGee, M, "A look inside Bing's human search rater guidelines", Retrieved From: https://searchengineland.com/bing-search-quality-rating-guidelines-130592, 2012, 7 Pages.
Rajaraman, et al., "Data Mining, In Mining of Massive Datasets". Cambridge: Cambridge University Press, 2011, 1 Page.

* cited by examiner

STRUCTURED LABELING TO FACILITATE CONCEPT EVOLUTION IN MACHINE LEARNING

BACKGROUND

Conventional labeling technology allows users to label content. The labels are used by a computer to differentiate among different types of content. The labeling technology may assign content to different groups. However, users may label content differently at different times, and different users may label data differently. This uncertainty in label application may impact labeling consistency and label quality.

For instance, conventional spam filters employ labeling technology to identify spam messages. The performance of the conventional spam filters depend directly on label quality and label consistency. Spam filters may be trained from a large corpus of content (e.g. emails or web pages) labeled as spam or not spam. Poorly trained spam filters may admit unwanted spam or, worse yet, incorrectly classify important content as spam.

Improvements in label quality or label consistency may yield superior performance in spam filtering, product recommendation, prioritization, etc. Label quality is affected by factors such as the labeler's expertise or familiarity with the concept or data, the labeler's judgment ability and attentiveness during labeling, and the ambiguity and changing distribution of the content. The label quality may be particularly important in situations where data quantity is limited (e.g., when labels are expensive to obtain or when individuals are labeling data for their own purposes).

To improve label quality and consistency, label noise and concept drift should be managed. The label noise may be identified when several different labels are applied to the same content. Concept drift may be identified by when quickly changing content requires several different labels. The label noise and concept drift are managed by technologies that provide set-based label judgments and temporally applied labels (e.g., by discarding or weighting information according to a moving window that changes as the underlying content changes.)

SUMMARY

Embodiments of the invention relate to systems, methods, and computer-readable media for, among other things, generating a graphical user interface that structures labeling of multimedia content. The structured labeling of multimedia content via the graphical user interface may permit concept evolution as labels, categories, or user-supplied tags are applied to the multimedia content. The structured labeling allows the user to categorize multimedia content with an existing schema (e.g., 'YES', 'NO', 'COULD BE', etc.) The structured labeling graphical user interface may, in at least one embodiment, allow a labeler to postpone labeling decisions.

In one embodiment, a structured labeling graphical user interface having several portions is generated by a computer. A first portion of the structured labeling graphical user interface is configured to display multimedia content. A second portion of the structured labeling graphical user interface is configured to assign the multimedia content to one of at least two categories. In turn, a user provides input to the graphical user interface. The user input may associate multimedia content displayed in the first portion with one of the at least two categories in the second portion of the graphical user interface. In an alternative embodiment, the user input may associate multimedia content displayed in the first portion with at least one group of the at least two categories. In certain embodiments, the user input may be, among other things, menu selections or drag-and-drop commands. For instance, hovering over the multimedia content with a selector, clicking on the multimedia content, dragging the multimedia content to one of the at least two categories, and dropping the multimedia content.

In some embodiments, the structured labeling graphical user interface is updated with summaries. The summaries are generated for the multimedia content associated with one or more groups. The groups may have, in one embodiment, user-supplied tags. In other embodiments, the summaries are generated for groups without user-supplied tags. Additionally, the structured labeling graphical user interface may provide recommendation for removing or adding multimedia content to the groups.

The user-supplied tags may correspond to the grouped multimedia content in at least one category. The user-supplied tags may receive user input that further define a concept corresponding to the multimedia content associated with one of the at least two categories or the user-supplied tags.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The embodiments of the invention are described in detail below with reference to the attached drawing figures, wherein.

DETAILED DESCRIPTION

Figure 1:
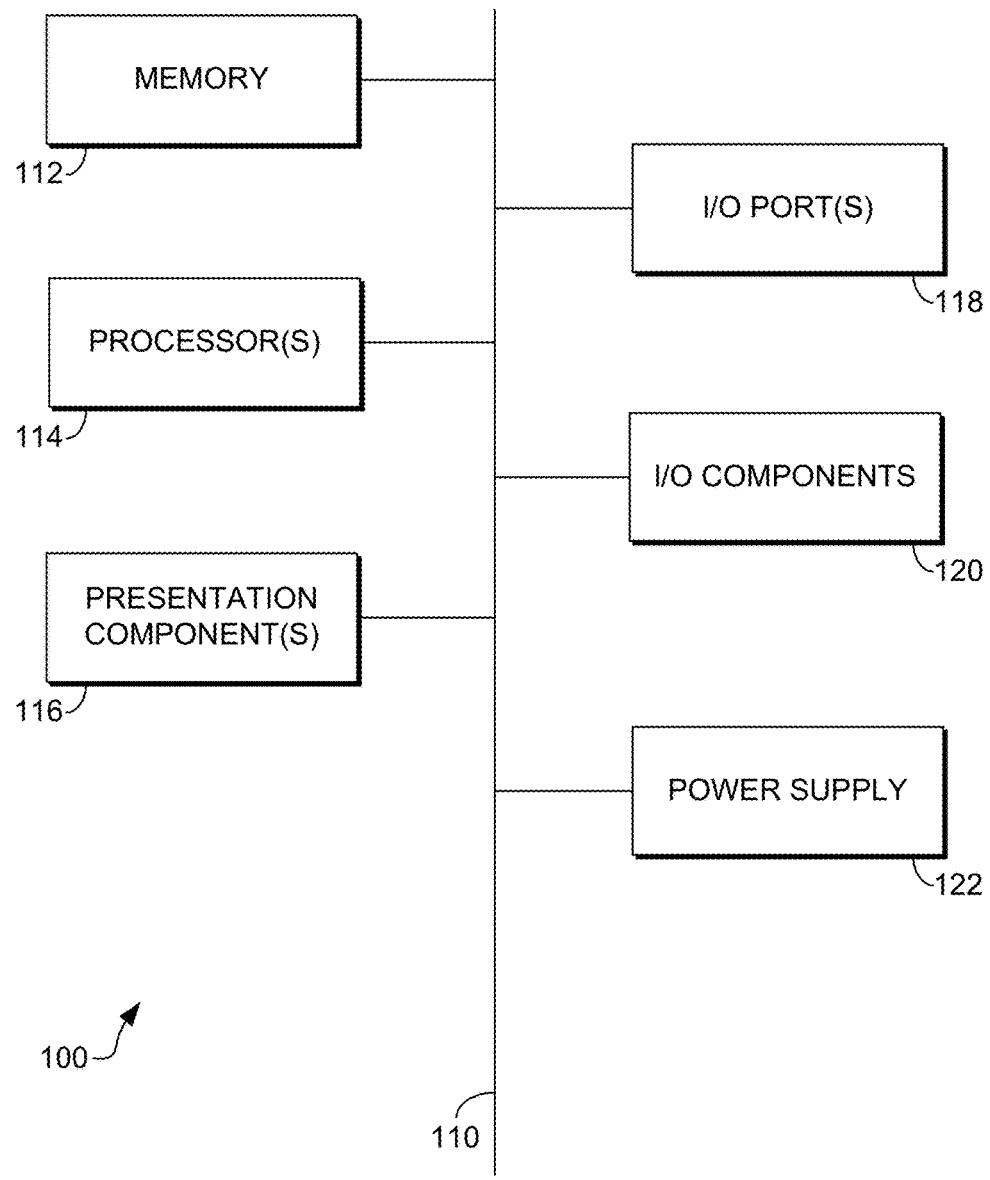
FIG. 1 is a block diagram illustrating an exemplary computing environment suitable for implementing embodiments of the invention.

The subject matter of this patent is described with specificity herein to meet statutory requirements. However, the description itself is not intended to necessarily limit the scope of the claims. Rather, the claimed subject matter might be embodied in other ways to include different steps or combinations of steps similar to the ones described in this document, in conjunction with other present or future technologies. Although the terms "step," "block," or "component," etc., might be used herein to connote different components of methods or systems employed, the terms should not be interpreted as implying any particular order among or between various steps herein disclosed unless and except when the order of individual steps is explicitly described.

As utilized herein, "concept evolution" refers to defining and refining a target concept by a labeler such that different labels are applied to similar items due to changes in the labeler's notion of the underlying concept over time. That is, similar items may be labeled differently not because the user perceives the items to be different from one another, but because their understanding of which items match their concept has evolved since labeling the earlier items. Noting this evolution may reduce inconsistency in labeling similar items when concept evolution is properly considered during label assignment.

As utilized herein, "category" is selected from a high level schema that includes at least two labels. In one embodiment, the labels may be "YES," "NO," and "COULD BE," which are predefined.

As utilized herein, "groups" are collection of multimedia content that are associated with a category. Each category may have one or more groups in some embodiments. The groups are malleable. A group may be moved between categories. The groups may be merged, deleted, or edited.

As utilized herein, "user-supplied tags" are descriptions selected or defined by a labeler. These tags, in one embodiment, are temporary and modifiable. In at least one embodiment, the tags are applied to groups of multimedia content within at least one category. The tags, in additional embodiments, are displayed within at least two predefined categories selected from 'YES,' 'NO,' or 'COULD BE.' The tags could create a hierarchy within the predefined categories. In other words, tags may be nested (e.g. tag "B" may be nested in tag "1").

Embodiments of the invention are directed to, among other things, multimedia content labeling. A server is configured to provide a prompt for a concept in a graphical user interface. The graphical user interface includes at least two categories for the prompt and one or more user-supplied tags for groups within each of the two categories. The server renders the multimedia content for display to a user in a portion of the graphical user interface. In turn, user input in the at least two categories or corresponding user-supplied tags is received. The user input, in an embodiment of the invention, may associate one of the at least two categories with the rendered multimedia content. The rendered multimedia content may be added to one or more groups corresponding to the at least two categories. Additionally, the user input may describe the grouped multimedia content with user-supplied tags. The server may store the user input, categories, and association between the multimedia content and the categories, groups, or user-supplied tags in a database.

The structured labeling graphical user interface assists labelers as they define and refine concepts for multimedia content. This structured labeling graphical user interface allows people to organize their concept definition by grouping and tagging data (e.g., 'YES, 'NO', and 'COULD BE'). The labeler's interaction with the structured labeling graphical user interface is logged to gain insights into grouping multimedia content. Based on the logged data, the server may identify group-specific features, generate one or more recommendations for grouping multimedia content, and assign weights to group structures. The structured labels may be utilized to build machine learners or evaluate algorithms.

Having briefly described an overview of embodiments of the invention, an exemplary operating environment in which embodiments of the invention may be implemented is described below to provide a general context for various aspects of these embodiments.

FIG. 1 is a block diagram illustrating an exemplary computing environment suitable for implementing embodiments of the invention. Referring to the figures in general and initially to FIG. 1 in particular and computing device 100. The computing device 100 is but one example of a suitable computing environment and is not intended to suggest any limitation as to the scope of use or functionality of embodiments of the invention. Neither should the computing device 100 be interpreted as having any dependency or requirement relating to any one component, or combination of components, illustrated.

The embodiments of the invention may be described in the general context of computer code or machine-useable instructions, including computer-executable instructions. These instructions may include program components being executed by a computer or other machine (e.g., a personal data assistant or other handheld device). Generally, program components, including routines, programs, applications objects, components, data structures, and the like, refer to code that performs particular tasks or implements particular abstract data types. Embodiments of the invention may be practiced in a variety of system configurations, including handheld devices, tablet computers, gaming devices, consumer electronics, general-purpose computers, specialty computing devices, etc. Embodiments of the invention may also be practiced in distributed computing environments, where tasks are performed by remote-processing devices that are linked through a communications network.

As one skilled in the art will appreciate, the computing device 100 may include hardware, firmware, software, or a combination of hardware and software. The hardware includes processors and memories configured to execute instructions stored in the memories. The logic associated with the instructions may be implemented, in whole or in part, directly in hardware logic. For example, and without limitation, illustrative types of hardware logic include field programmable gate array (FPGA), application-specific integrated circuit (ASIC), system-on-a-chip (SOC), or complex programmable logic devices (CPLDs). The hardware logic allows a device to generate a structured labeling graphical user interface for a user. The device is configured to receive user input at the graphical user interface and to log the user interaction with the graphical user interface. The device may recommend groupings or summaries based on the user interaction that associated multimedia content rendered in the graphical user interface with one or more categories. The device may, in an embodiment, display statistics associated with groupings and categories in the graphical user interface.

With continued reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear and, metaphorically, the lines would more accurately be grey and fuzzy. For example, one may consider a presentation component, such as a display device, to be an I/O component. Also, processors have memory. The inventors hereof recognize that such is the nature of the art and reiterate that the diagram of FIG. 1 is merely illustrative of an exemplary computing device that can be used in connection with one or more embodiments of the invention. Distinction is not made between such categories as "workstation," "server," "laptop," "handheld device," etc., as all are contemplated within the scope of FIG. 1 and refers to "computer" or "computing device."

Computing device 100 typically includes a variety of computer-readable media. Computer-readable media can be any available media that is accessible by computing device 100 and includes both volatile and nonvolatile media, removable and non-removable media. Computer-readable media may comprise computer storage media and communication media.

Computer storage media includes volatile and nonvolatile, removable and non-removable media implemented in any method or technology for storage of information such as computer-readable instructions, data structures, program modules or other data. Computer storage media includes, but is not limited to, Random Access Memory (RAM), Read Only Memory (ROM), Electronically Erasable Programmable Read Only Memory (EEPROM), flash memory or other memory technology, CD-ROM, digital versatile disks (DVD) or other holographic memory, magnetic cassettes, magnetic tape, magnetic disk storage or other magnetic storage devices, or any other medium that can be used to encode desired data and that can be accessed by the computing device 100. In an embodiment, the computer storage media can be selected from tangible computer storage media like flash memory. These memory technologies can store data momentarily, temporarily, or permanently. Computer storage does not include and excludes communication media.

On the other hand, communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media such as acoustic, RF, infrared and other wireless media.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components 116 include a display device, speaker, printing component, vibrating component, etc. I/O ports 118 allow computing device 100 to be logically coupled to other devices including I/O components 120, some of which may be built in. Illustrative I/O components include a microphone, joystick, game pad, satellite dish, scanner, printer, wireless device, a controller (such as a stylus, keyboard, and mouse) or a natural user interface (NUI), etc.

The NUI processes gestures (e.g., hand, face, body, etc.), voice, or other physiological inputs generated by a user. These inputs may be interpreted as terms for user-supplied tags, requests for associating multimedia content with categories, or requests for modifying groups having the multimedia content. The input of the NUI may be transmitted to the appropriate network elements for further processing. The NUI implements any combination of speech recognition, touch and stylus recognition, facial recognition, biometric recognition, gesture recognition both on screen and adjacent to the screen, air gestures, head and eye tracking, and touch recognition associated with displays on the computing device 100. The computing device 100 may be equipped with depth cameras, such as stereoscopic camera systems, infrared camera systems, RGB camera systems, and combinations of these, for gesture detection and recognition. Additionally, the computing device 100 may be equipped with accelerometers or gyroscopes that enable detection of motion. The output of the accelerometers or gyroscopes is provided to the display of the computing device 100 to render immersive augmented reality or virtual reality.

As previously mentioned, embodiments of the invention are generally directed to systems, methods, and computer-readable storage media for, among other things, generating a structured labeling graphical user interface configured to render multimedia content and associate the multimedia content with categories. At least a portion of the graphical user interface provides user-supplied tags that may be associated with the rendered multimedia content. The user-supplied tags may describe groups of multimedia content within the categories of the structured labeling graphical user interface. In some embodiments, the groups may be nested within each other. Accordingly, Group A may be nested in Group 1. This nesting may create a hierarchy for organizing the labeled multimedia content.

Various aspects of the technology described herein are generally employed in computer systems, computer-implemented methods, and computer-readable storage media for, among other things, associating the multimedia content with user-supplied tags and categories in a structured labeling graphical use interface. In one embodiment, a server executes suggestion components that detect associations between the user-supplied tags and the grouped multimedia content and provide grouping suggestions for uncategorized multimedia content or suggestions for modifying groups of categorized multimedia content. The server may display the suggestions to the user, who may decide to accept the suggestions or to decline the suggestions. The server may log user interaction with the structured labeling graphical user interface to gather metrics (e.g., dwell time, click frequency, revision per group, revision per user-supplied tag, and number of multimedia content per group, etc.) for storage in a data store.

In one embodiment, a computer system is configured to label multimedia content. The computer system includes, among other components, a grouping and tagging component and a summary generation component. The grouping and tagging component receives the user input, associates multimedia content with one or more categories or user-supplied tags based on the user input, and updates the user-supplied tags from terms provided in the user input. The summary generation component provides summaries for the multimedia content associated with the groups, one or more categories, or user-supplied tags. The summaries may be used by the user to modify the user-supplied tags or the groups having the multimedia content. The user may associate uncategorized multimedia content with the groups, categories, or the user-supplied tags based on the generated summaries.

Figure 2:
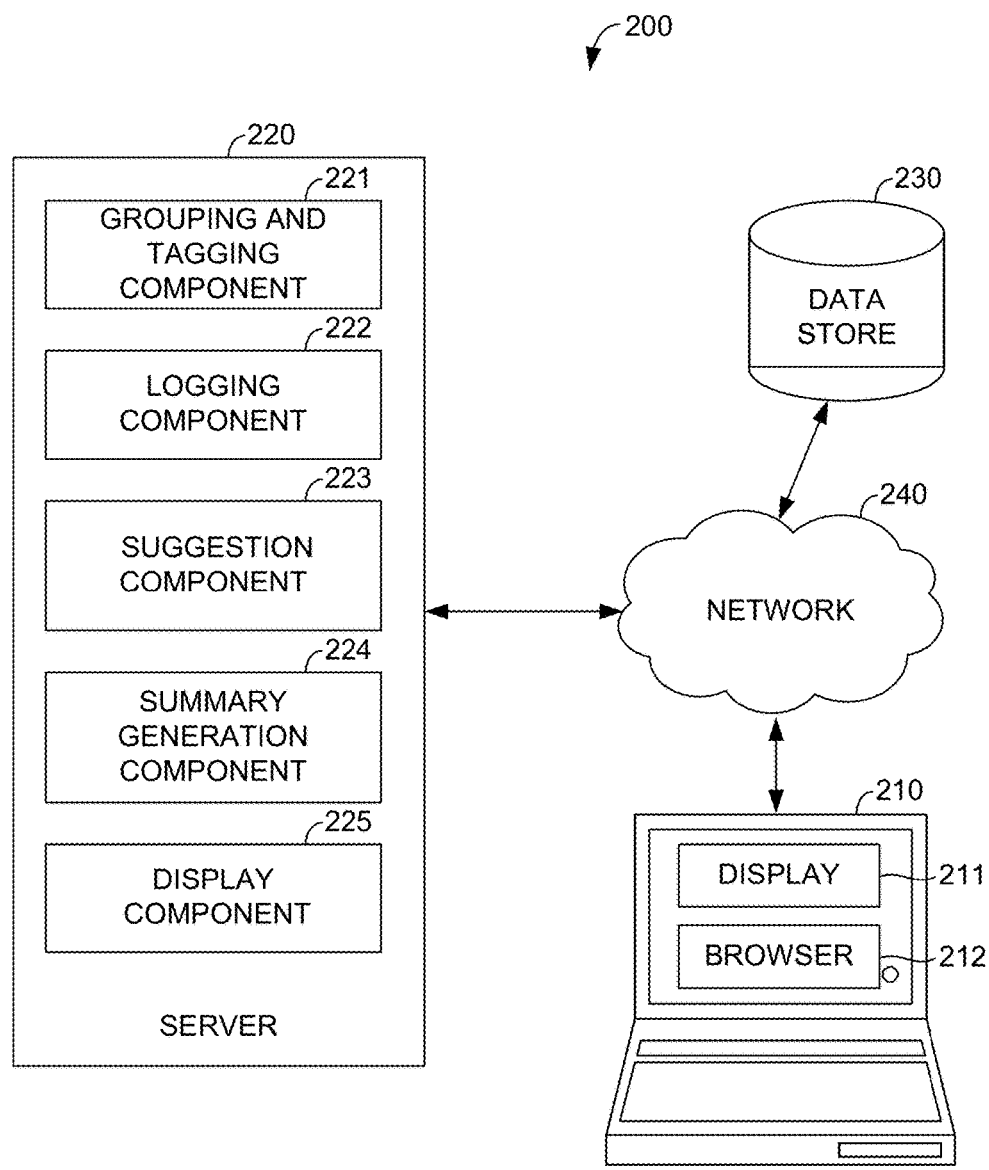
FIG. 2 is a network diagram illustrating a network environment suitable for implementing embodiments of the invention.

FIG. 2 is a network diagram illustrating a network environment suitable for implementing embodiments of the invention. The computing system 200 may include client device 210, server 220, data store 230, and network 240. The network 240 may communicatively connect the client device 210, server 220, and data store 230. It should be understood that any number of client computing devices 210, servers 220 and data stores 230 may be employed in the computing system 200 within the scope of embodiments of the invention. Each may comprise a single device/interface or multiple devices/interfaces cooperating in a distributed environment. For instance, the server 220 may comprise multiple devices and/or modules arranged in a distributed environment that collectively provide the functionality of the server 220 described herein. Additionally, other components/modules not shown also may be included within the computing system 200.

In some embodiments, one or more of the illustrated components/modules may be implemented as stand-alone applications. In other embodiments, one or more of the illustrated components/modules may be implemented via the client device 210, as an Internet-based service, or as a module inside the server 220. It will be understood by those of ordinary skill in the art that the components/modules illustrated in FIG. 2 are exemplary in nature and in number and should not be construed as limiting. Any number of components/modules may be employed to achieve the desired functionality within the scope of embodiments hereof. Further, components/modules may be located on any number of search engines or user computing devices. By way of example only, the server 220 might be provided as a single server (as shown), a cluster of servers, or a computing device remote from one or more of the remaining components.

The client device 210 may be used to input one or more user-supplied tags and to associate multimedia content with categories or grouped multimedia content with user-supplied tags via a structured labeling graphical user interface. The client device 210 may communicate the user input received at the structured labeling graphical user interface to the server 220. In an embodiment, the client device 210 may include any type of computing device, such as the computing device 100 described with reference to FIG. 1, for example.

Generally, the client device 210 includes a display 211 and a browser 212. The display 211 is configured to present various content including, without limitation, a structured labeling graphical user interface having, among other things, a first portion for rendering multimedia content and a second portion for categories and user-supplied tags that may be associated with the multimedia content as described herein. The structured labeling graphical user interface is designed to increase label consistency by assisting users by explicitly surfacing and recalling labeling decisions. Further, the structured labeling graphical user interface enables users to create, delete, split, and merge groups. This allows users to frequently refine their concept definition as they observe additional portions of multimedia content or other types of multimedia content. The graphical user interface, in certain embodiments, may provide assisted structured labeling. The assisted structured labeling is presented to the user as visual aids with a configurable level of automation to further assist users as they label multimedia content and while their understanding of the concept or multimedia content evolves.

The structured labeling graphical use interface, in one embodiment, may display one multimedia content at a time. In other embodiments, the graphical user interface may display several multimedia content at the same time. The graphical user interface may also prompt users to categorize the multimedia content into one of three high-level categories: 'YES', 'NO', or 'COULD BE' for a current concept prompt (e.g. "CARS"). For instance the prompt may be "WHETHER THE CURRENT MULTIMEDIA CONTENT IS AN EXAMPLE OF CONCEPT X." In addition, participants could create via the structured labeling graphical user interface user-supplied tags for groups within the categories. For a 'COULD BE' category the user may create a user-supplied tag as a reminder of the group of multimedia content that is associated with the current user-supplied tag. The user-supplied tag may include a description. In some embodiments, the user-supplied tag lacks a description and may be user a placeholder to display one or more suggestions generated by the summary generation component 224. The structured labeling graphical user interface organizes the multimedia content with mutually exclusive categories such as 'YES', 'NO', and 'COULD BE') and provides grouping and tagging of the multimedia content within the categories. The users may drag multimedia content from a rendering portion of the structured labeling graphical user interface to a labeling area. The user may drop the multimedia content over an existing user-supplied tag or over a category to create or update groupings of the multimedia content. The user may drop the multimedia content over a visual indicator to create a new user-supplied tag. In embodiments, the display 220 is further configured to enable touch or gesture inputs from a user or provide a NUI.

The browser 212 is configured to render multimedia content, for instance, web pages, video files, audio files, etc., in association with the display 211 of the client computing device 210. The browser 212 is further configured to receive user input for refining or defining the user-supplied tags, updating groupings of the multimedia content (generally inputted via a graphical user interface or NUI) and to receive multimedia content for presentation on the display 211, for instance, from the data store 230. The browser 212 may be any suitable type of web browser such as INTERNET EXPLORER®, FIREFOX®, CHROME®, SAFARI®, or other type of software configured to enable structured labeling of multimedia content as described herein. It should be noted that the functionality described herein as being performed by the browser 212 may be performed by any other application capable of rendering multimedia content. Any and all such variations, and any combination thereof, are contemplated to be within the scope of embodiments of the invention.

The server 220 is configured to receive user input from the client devices 210, provide group suggestions or summaries to assist the user, and log user interaction with a structured labeling graphical user interface transmitted to the client device 210. The server may implement any combination of the following components to process the user input: a grouping and tagging component 221, a logging component 222, a suggestion component 223, a summary generation component 224, and a display component 225. In one embodiment, the components of the server 220 may be executed locally by the client device 210 to process the multimedia content stored in the data store 230.

The grouping and tagging component 221, in one embodiment, receives user input from the client device 210. The user input may associate multimedia content rendered in the structured labeling interface with one or more categories. The one or more categories may be predefined in at least one embodiment. In other embodiments, the one or more categories may be configured based on user input in the graphical user interface. The user input, in some embodiments, includes user-supplied tags having terms that describe multimedia content grouped within a category. The grouping and tagging component 221 may group the multimedia content within categories based on the user input. The user-supplied tags, in at least one embodiment, are rendered with visual representation of the grouped multimedia content within the categories in the structured labeling graphical user interface. The terms received from the user are displayed in the user-supplied tags and a visual indicator representing multimedia content associated with the user-supplied tag may be updated to reflect an association between the grouped or rendered multimedia content and the user-supplied tag. In other embodiments, the user-supplied tags may be selected in the graphical user interface. For instance, a user may right-click on the multimedia content to select terms that describe the concept corresponding to the multimedia content. In additional embodiments, the grouping and tagging component 221 may receive user input that drags the user-supplied tags or categories over or near the multimedia content and drops the user-supplied tags or categories onto the multimedia content to add the multimedia content to the group having the user-supplied tag or category.

In certain embodiments, the logging component 222 receives the user inputs and logs the user inputs and other metadata associated with the structured labeling graphical user interface in the data store 230. The logging component 222 may log the number of multimedia content associated with the categories. In one embodiment, the logging component 222 may log the number of multimedia content associated with each group, including groups with user-supplied tags in the data store 230. The data store 230 may store the associations between the multimedia content and the categories and user-supplied tags. The data store 230 may receive log data from the logging component 222. The log data may include, among other things, the number of revisions to the groups, the length of time that transpired before a user associated multimedia content with a category or user-supplied tag, whether the user-supplied tag is completed by the user, whether the user-supplied tag is complete based on a summary provided by the summary generation component, the number of revisions to the user-supplied tags, and the length of time it takes to classify all multimedia content stored in the data store 230. The structured labeling graphical user interface allows the user to preform edits by moving user-supplied tags between categories (e.g., preserving any accompanying tags and associated multimedia content), merging user-supplied tags, or moving individual multimedia content between user-supplied tags.

The suggestion component 223 receives the log data and generates suggestions for grouping multimedia content. The suggestion component 223, in one embodiment, provides suggestions for grouping multimedia content. For instance, the suggestion component may provide suggestions for modifying the groups of multimedia content that are associated with the categories or the user-supplied tags. Additionally, the suggestion component 223 may provide suggestions for associating the uncategorized multimedia content with the categories or the groups having the user-supplied tags.

In certain embodiments, the suggestions from the suggestion component 223 are computed based on similarity between an uncategorized multimedia content and a group of multimedia content associated with the categories or the user-supplied tags. The group of multimedia content that is most similar to the uncategorized multimedia content is suggested as a potential association for the uncategorized multimedia content. The suggestion component 223 computes item-to-group similarity as the similarity between the uncategorized multimedia content item and the most similar multimedia content in the group of the multimedia content of each user-supplied tag or category. For instance, the suggestion component 223 may compute similarity between the uncategorized multimedia content and all multimedia content associated with each of each group of multimedia content with a user-supplied tag or category. In turn, the suggestion component 223 selects the 'shortest-link' as the similarity value. The suggestion component 223 computes item-to-item similarity via the cosine similarity metric. In other embodiments, a term frequency-inverse document frequency (TF-IDF) may be used to calculate similarity. The recommendations for grouping may be displayed on the structured labeling graphical user interface as a 'wiggle' animation on the group to draw the user's attention or a static indicator visible within the recommended group. In some embodiments, the suggestion component 223 may generate a similarity window. The suggestion component 223 may select the most similar unlabeled multimedia content to the multimedia currently being labeled. The similar multimedia content, for display in the similarity window, may be identified using the same item-to-item similarity measure used to make group recommendations.

The summary generation component 224, in some embodiments, receives groups of multimedia content associated with each of the user-supplied tags. In an alternate embodiment, the summary generation component 224 may receive multimedia content corresponding to each category or one or more groups within each category. The summary generation component 224 generates summaries that may be included near the user-supplied tags. The groups may have, in one embodiment, user-supplied tags. In other embodiments, the summaries are generated for groups without user-supplied tags.

The summary generation component 224 may identify terms from the multimedia content associated with the user-supplied tags. The terms selected are best able to summarize the set of multimedia content associated with the user-supplied tag. The summary generation component 224 may analyze the document structure (e.g., heading, titles, metadata, and file type) to summarize the multimedia content. In one embodiment, two bag-of-words algorithms are executed to create textual summaries. Initially, the summary generation component 224 considers the content of multimedia content associated with each user-supplied tag as a bag-of-words (i.e., the set of words from all the multimedia content associated with the user-supplied tag). In turn, the summary generation component 224 selects the most frequently occurring words from the bag, with frequency computed via the common term frequency inverse document frequency (TF-IDF). In an alternate embodiment, the summary generation component 224 accesses query logs of a search engine (not shown). The search terms associated with the multimedia content are extracted from the search log. The search terms include phrases that searchers used to locate that multimedia content via the search engine. Because these phrases are typically short and targeted, the summary generation component 224 may return the selected query terms as summaries. In one embodiment, the search query phrases with the highest TF-IDFs are displayed as summaries. These summaries may display the most prominent search terms used to find the web pages within each group and are updated in real-time as multimedia content changes.

In optional embodiments, the display component 225 is executed by the server 220 to render the user experiences for providing (i) entry of user input and (ii) viewing of multimedia content and associations between categories or user-supplied tags and the multimedia content. The display component 225 provides both user input entry and grouping of multimedia content user experiences. The viewing experiences on the structured labeling graphical user interface include providing visual representations of the multimedia content associated with the categories and user-supplied tags.

The display component 225 provides term highlighting as visual cues for suggested groupings of multimedia content in the graphical user interface. The visual cues may include icons such as "*" to assist users that are associating the multimedia content with the categories or user-supplied tags. The "*" may be rendered proximate to the suggested category or user-supplied tag for the multimedia content currently being considered by the user.

The data store 230 is accessed by the server 220 to select multimedia content for labeling. The data store 230, in turn, stores search logs and log data from the user interaction with the structured labeling graphical user interface. The data store 230 may be a relational database that includes an index to content, including image, audio, video, text, webpages, etc. The data store 230 may also include a log that tracks statistics (e.g., decision time, click rate, term frequency, revision frequency, etc.) for each of the associated multimedia content, categories, and user-supplied tags. These statistics are sent to the suggestion component 223 (for creating group suggestions) or to the summary generation component 224 (for ranking of the summaries). The stored structure (e.g., categories and user-supplied tags) for each multimedia content may be shareable with other labelers that are considering labels for similar multimedia content or the same multimedia content. Thus, other labelers may have insight into how others have labeled the multimedia content.

The network 240 communicatively connects the search engine 220 and client device 210. The network 240 may include, without limitation, one or more local area networks (LANs) and/or wide area networks (WANs). Such networking environments are commonplace in offices, enterprise-wide computer networks, intranets and the Internet. Accordingly, the network 240 is not further described herein.

The exemplary computing system 200 in which embodiments of the invention are employed is described above. Generally, the computing system 200 illustrates an environment in which group suggestions are provided to assist labelers as they associate multimedia content with user-supplied tags and categories. As will be described in further detail below, embodiments of the invention provide methods and graphical user interface elements for structured labeling of multimedia content. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional components that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Accordingly, the structured labeling graphical user interface associates labels with multimedia content. Moreover, the structured labeling graphical user interface may provide assistance to labelers. The assisted structured labeling graphical user interface generates automated visual cues and recommendations that are explicitly surfaced to assist in recall of labeling decisions.

Figure 3:
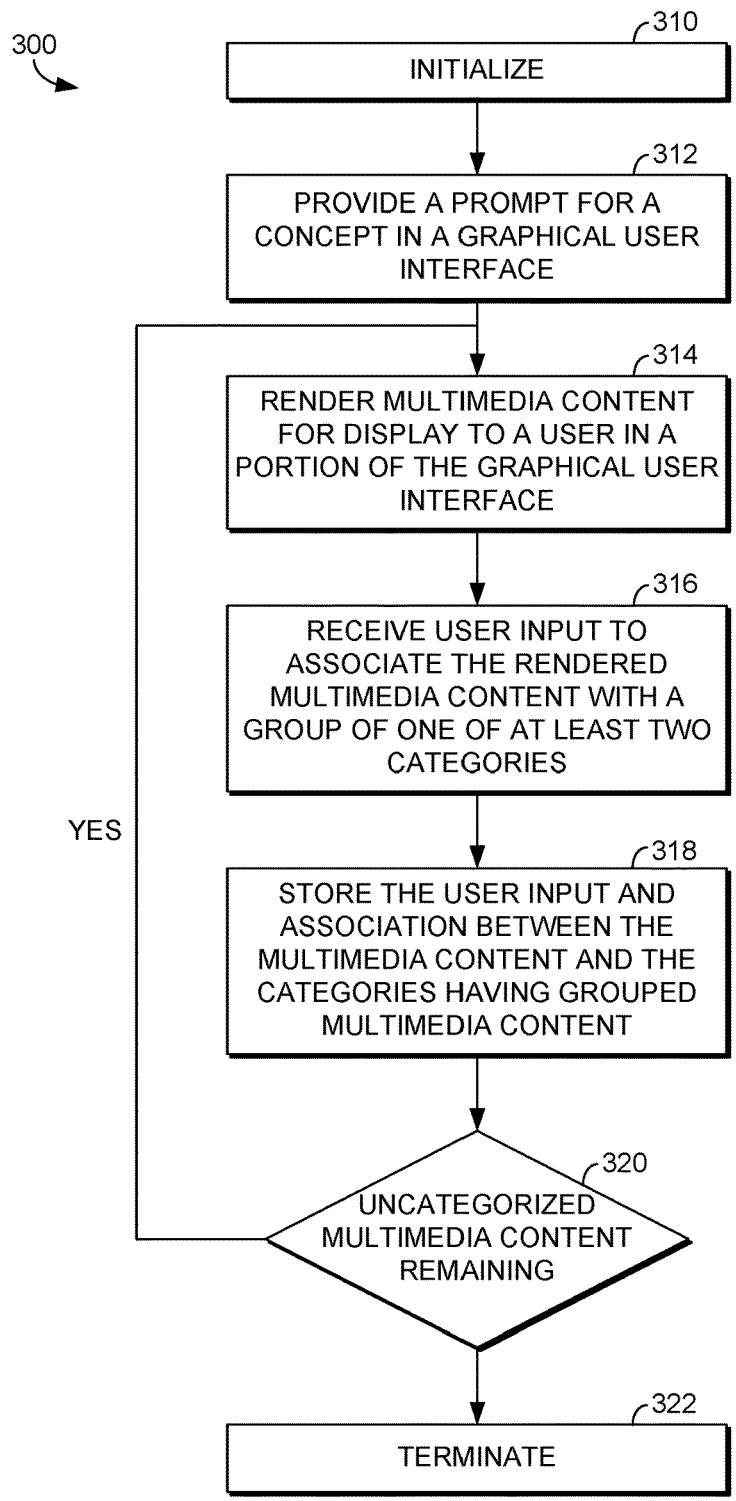
FIG. 3 is a logic diagram illustrating a computer-implemented method of multimedia content labeling, in accordance with embodiments of the invention.

FIG. 3 is a logic diagram illustrating a computer-implemented method 300 of multimedia content labeling, in accordance with embodiments of the invention. The method initializes in step 310 on a server. The multimedia content may include a collection of webpages, audio files, or video files.

In step 312, the server, optionally, provides a prompt for a concept in a graphical user interface. The graphical user interface, in one embodiment, includes at least two categories for the prompt. One or more user-supplied tags for groups within each of the two categories may be received via the graphical user interface. The graphical user interface may provide a viewable region in the graphical user interface with multimedia content similar to multimedia content associated with the at least two categories. In one embodiment, the at least two categories are selected from 'YES', 'NO', and 'COULD BE'.

In turn, the server, in step 314, renders multimedia content for display to a user in a portion of the graphical user interface. The graphical user interface receives, in step 316, user input in the at least two categories to associate the multimedia content in the graphical user interface with one of the two categories. Additionally, the user input may correspond to user-supplied tags that describe the concept of multimedia content grouped within the at least two categories. The user-supplied tags are assigned to one or more groups of multimedia content. In some embodiments, the groups may be subgroups of a group. All groups are associated with at least on the at least two categories. In one embodiment, the user input is dragging and dropping a visual representation of the multimedia content onto or near one of the at least two categories or a group having the user-supplied tags. In certain embodiments, the user input may include removing, combining, or adding user-supplied tags to the graphical user interface. In other embodiments, the user input may include removing, combining, or adding groups to the graphical user interface.

The server associates one of the at least two categories or the groups having the user-supplied tags with the rendered multimedia content. The server may update the graphical user interface with visual indicators. The visual indicators may represent a number of multimedia content associated with the groups of the at least two categories. These visual indicators may be displayed proximate to the at least two categories. In other embodiments, the visual indicators may be thumbnails of the multimedia content or icons associated with a file format of the multimedia content. In another embodiment, the visual indicators are numerical values. In yet another embodiment, the visual indicator reveals previews of additional content for the multimedia content in response to a hover command over the visual indicator.

The server, in step 318, stores the user input, categories, and association between the multimedia content and the categories or user-supplied tags in a database. The database may store a user interaction log. In one embodiment, the database stores a number of multimedia content associated with the at least two categories, and a number of multimedia content associated with each group having the user-supplied tags. The database may also store an amount of time that occurs between each input event received from the user. This database may also store a number of revisions made to user-supplied tags or a number of move, combine, add, or delete inputs received for each of the at least two categories.

In step 320, the server determines whether uncategorized multimedia content still exist. If uncategorized multimedia content exist, the server returns to step 314. If uncategorized multimedia content does not exist, the server continues to step 322. The method terminates in step 322.

Accordingly, the server provides a structure for hierarchically organizing and grouping multimedia content based on categories or user-supplied tags. The structured graphical user interface may provide improvements in label consistency by assisting labeler's to explicitly surface and recall their labeling decisions. The structured graphical user interface provides the user-supplied tags that receive metadata to aid in organization and recall. In turn, the structured graphical user interface may provide automated summaries of group multimedia content, suggestions for altering groups, and interactive revisions to group categories and user-supplied tags (e.g., moving groups within a category, adding and deleting user-supplied tags, merging and splitting user-supplied tags, adding or removing multimedia content within user-supplied tags, or revising user-supplied tags).

In additional embodiments of the invention, the structured graphical user interface may provide assistance during labeling. The structured graphical user interface renders various visual aids and some automation to assist labelers. For instance, visual aids may include, among other things, providing category recommendations (to improve label consistency or to reduce effort in tagging), providing tagging recommendations (to reduce effort in tagging), summarizing items within a user-supplied tags (to aid in recall of group contents), and rendering similar items or the number of similar items to the item being organized (to aid in structuring decisions).

Figure 4:
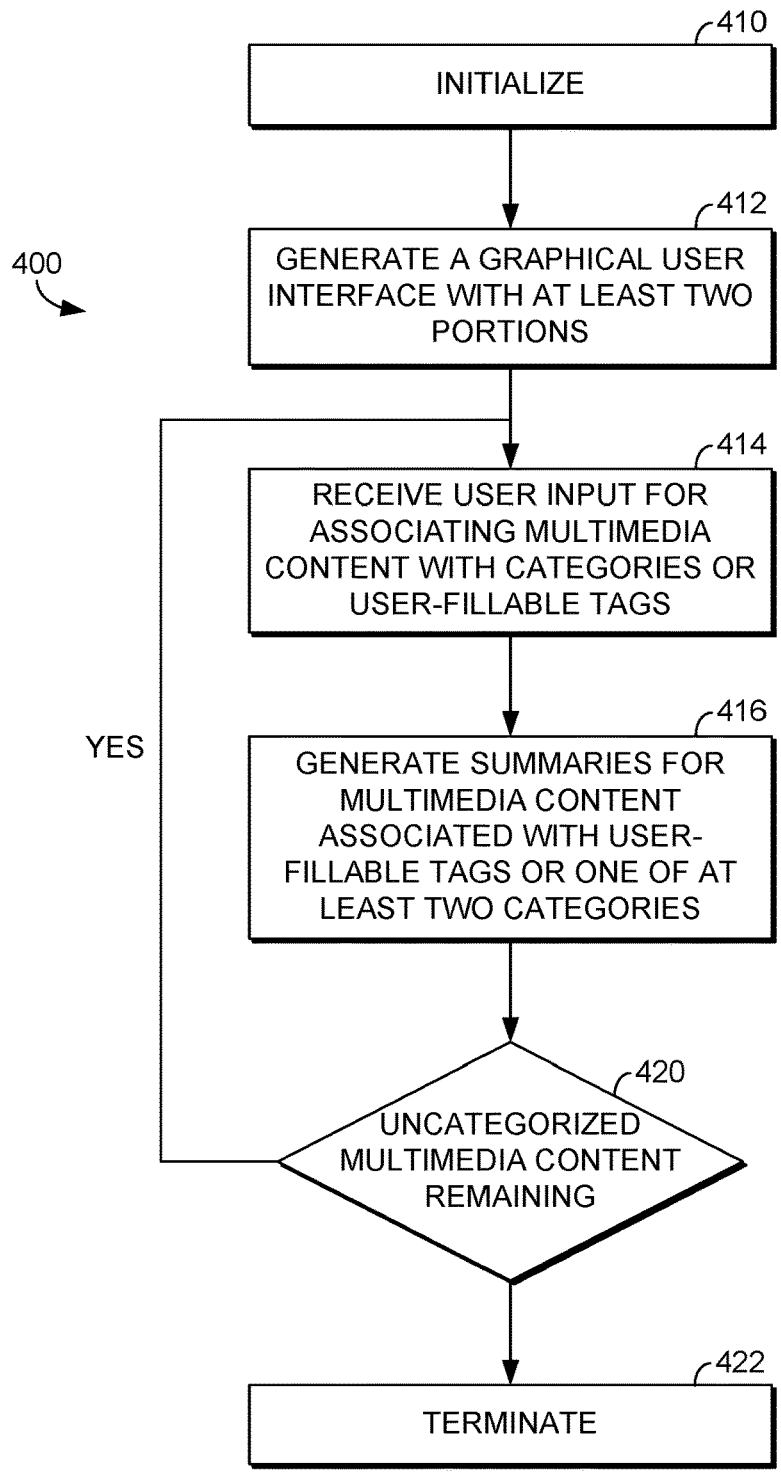
FIG. 4 is another logic diagram illustrating a computer-implemented method of generating a structured labeling graphical user interface, in accordance with embodiments of the invention.

FIG. 4 is another logic diagram illustrating a computer-implemented method 400 of generating a structured labeling graphical user interface label acquisition, in accordance with embodiments of the invention. The method initializes in step 410 when loaded into memory by the server. In step 412, the server generates a graphical user interface with at least two portions. The first portion displays multimedia content. The second portion assigns the multimedia content to at least two categories. The server, in certain embodiments, may generate a third portion of the graphical user interface having uncategorized multimedia content that are similar to each other. The server may determine similarity based on term frequency within the multimedia content.

The server, in step 414, receives user input for associating multimedia content displayed in the first portion with at least one of two categories in the second portion of the graphical user interface. In some embodiments, the multimedia content is associated with at least one group of the at least two categories. In one embodiment, the user input is a gesture. In another embodiment, the user input is a voice command.

In turn, the server may, in step 416, generate assistance for the labeler. The assistance may include summaries. The summaries may correspond to multimedia content associated with the at least two categories. The summaries generated by the server may be based on multimedia content associated with at least one group within one of the at least two categories. Alternatively, the server may generate summaries for multimedia content associated with user-supplied tags that correspond to groups within each of the at least two categories. These generated summaries may be rendered in a visual representation of the user-supplied tags, in some embodiments of the invention.

The user-supplied tags may receive input that further describe a concept corresponding to the multimedia content grouped within one of the at least two categories or having the user-supplied tags. The graphical user interface is updated to reflect, among other things, the association between the selected one of the at least two categories and the multimedia content.

In step 420, the server determines whether uncategorized multimedia content exist. If uncategorized multimedia content exist, the server returns to step 414. If uncategorized multimedia content does not exist, the server continues to step 422. The method terminates in step 422.

Thus, the graphical user interface is updated to provide assistance via visual aids. These visual aids may include, among other things, providing category recommendations, providing tagging recommendations, summarizing multimedia content within a group of multimedia content having the user-supplied tags, and rendering similar multimedia content or the number of similar multimedia content to the multimedia content being organized.

In one embodiment, the structured labeling graphical user interface may include several portions. For instance, an exemplary structured labeling graphical user interface may be configured with a prompt portion, multimedia content portion, and category portion. The structured labeling graphical user interface may provide assistance to the user when the associated multimedia content rendered in the multimedia content portion is assigned to categories or groups of multimedia content having user-supplied tags rendered in the category portion.

Figure 5:
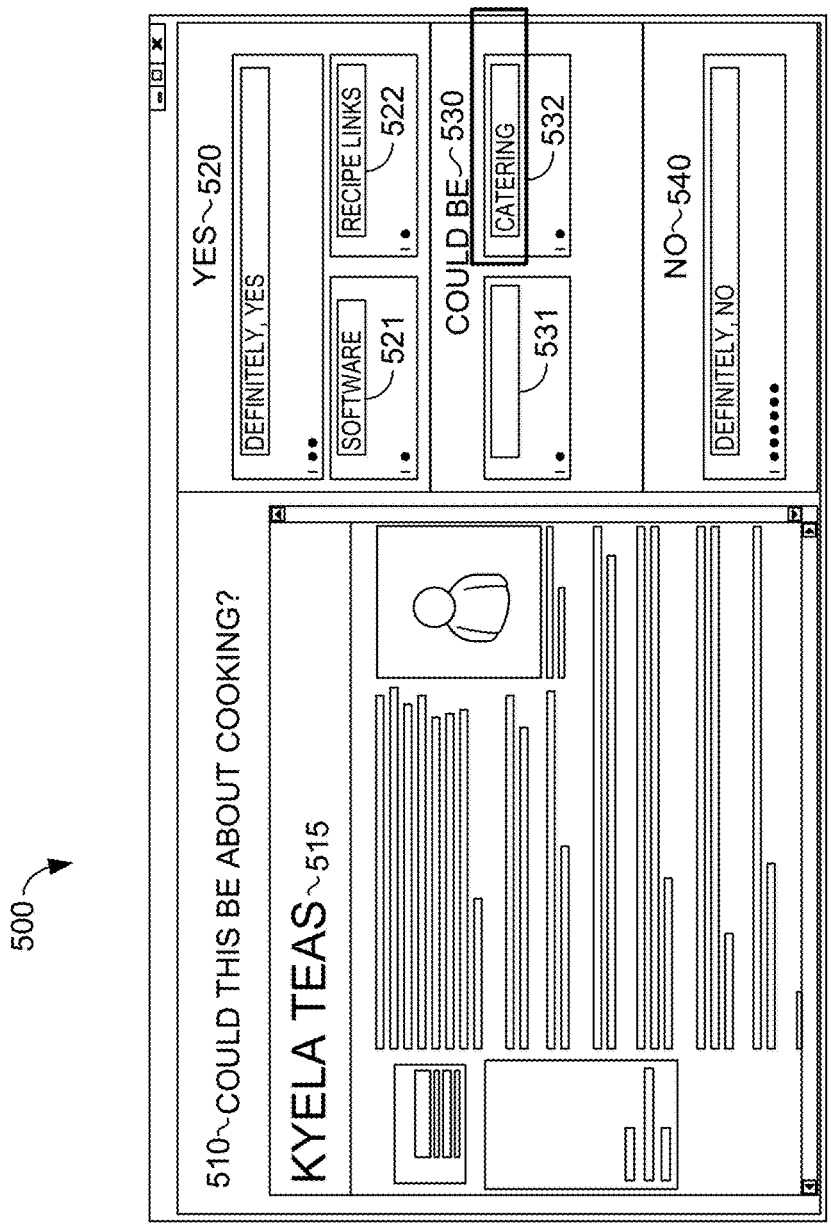
FIG. 5 is a screen shot illustrating an exemplary graphical user for structured labeling, in accordance with embodiments of the invention.

FIG. 5 is a screen shot illustrating an exemplary graphical user 500 for structured labeling in accordance with embodiments of the invention. The structured labeling graphical user interface 500 may include a prompt portion 510, multimedia content portion 515, and category portion 520, 530, or 540.

The prompt portion 510 may provide a prompt for a concept under consideration by the labeler. For instance, the prompt may be about "COOKING." In turn, the labeler may review multimedia content and assign the multimedia content to at least one category. The prompt portion 510 may be updated with a new concept after all the multimedia content is classified.

The multimedia content portion 515 may render the multimedia content. In one embodiment, the multimedia content is rendered individually (e.g. "one at a time"). The labeler may decide to associate the multimedia content with at least one category 520, 530, or 540. The category 520, 530, or 540 may be predefined in an embodiment. In other embodiments, the category is alterable and may be selected based on user input.

The category portion 520, 530, or 540, in an embodiment, provides three categories: "YES" 520, "COULD BE" 530, and "NO" 540. The categories may each have user-supplied tags. For instance, category 520 may have two user-supplied tags (e.g. "SOFTWARE" 521 and RECIPE LINKS 522). Category 530 may have two user-supplied tags of which one is blank (e.g. NULL 531 and CAETERING 532). Category 540 may have zero user-supplied tags. The multimedia content may be associated with the categories 520, 530, or 540 or the groups having the user-supplied tags 521, 522, 531, 532.

In another embodiment, the structured labeling graphical user interface may include several visual indictors that provide assistance to the labeler. For instance, an exemplary structured labeling graphical user interface may be configured with a similar window visual indicator, summary visual indicator, and suggestion visual indicator. The visual indicators of the structured labeling graphical user may provide additional assistance to the user when associating multimedia content rendered in the multimedia content portion with categories or with groups having the user-supplied tags of the category portion.

Figure 6:
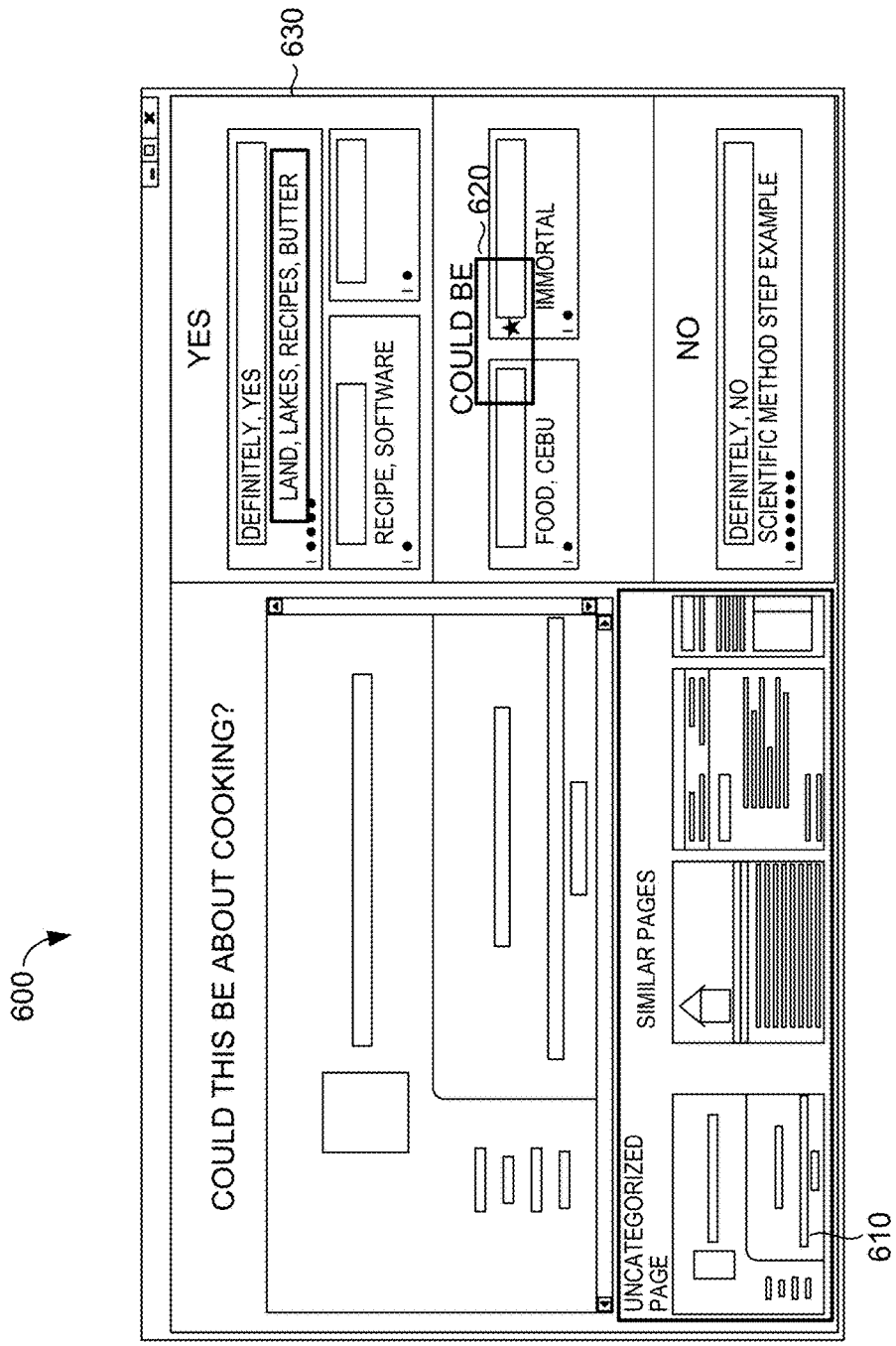
FIG. 6 is a screen shot illustrating another exemplary graphical user for assisted structured labeling, in accordance with embodiments of the invention.

FIG. 6 is a screen shot illustrating another exemplary graphical user 600 for assisted structured labeling in accordance with embodiments of the invention. The structured labeling graphical user interface 600 may provide visual indicators that include a similarity window visual indicator 610, a suggestion visual indicator 620, and a summaries visual indicator 630.

The similarity window visual indicator 610 may display multimedia content that is similar to the multimedia content that is currently being categorized. In some embodiments, the similarity window visual indicator 610 may include thumbnails of the multimedia content that is currently being categorized and other multimedia content that is similar to it. In one embodiment, the other multimedia content that is identified as similar consist of uncategorized multimedia content.

The suggestion visual indicator 620 may provide a recommendation of which category to associate the currently being categorized multimedia content. The suggestion visual indicator 620 may include, among other things, a star. In other embodiments, the suggestion visual indicator 620 may be an animation that shows the multimedia content transitioning from the multimedia content portion of the graphical user interface 600 to the appropriate location in the category portion of the graphical user interface 600.

The summaries visual indicator 630 may include at least one or more terms that are generated to summarize multimedia content associated with the groups of multimedia content having user-supplied tags or the categories. The summaries visual indicator 630 may be highlighted in the graphical user interface. The highlighting may include font formatting (e.g., bold, italics, or color) or font animation (e.g. blinking, growing, shirking, etc.)

Accordingly, these visual indicators rendered in the structured labeling graphical user interface are provided to improve user performance while labeling multimedia content. The structured labeling graphical user interface updates the visual indicators as the user associates multimedia content with the categories of groups having user-supplied tags. The server logs the interaction of the user with structured labeling graphical use interface to determine whether user performance is improved with the use of the visual aids.

In at least one embodiment, the structured labeling graphical user interface may render statistics associated with the multimedia content. For instance, the statistics may include the number of multimedia content associated each of the categories or the groups with the user-supplied tags. The statistics may be visualized as a number or an icon representing the multimedia content.

Figure 7:
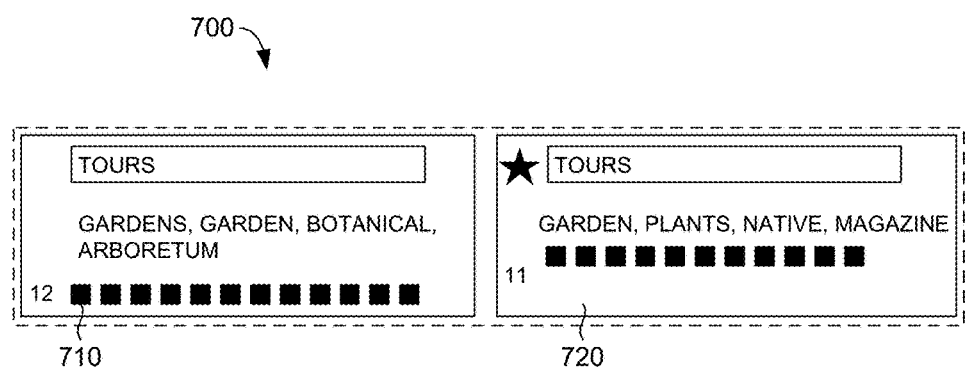
FIG. 7 is a screen shot illustrating an exemplary user-supplied tag with visual representations for associated multimedia content, in accordance with embodiments of the invention.

FIG. 7 is a screen shot illustrating an exemplary user-supplied tag 710 and 720 with visual representations for associated multimedia content in accordance with embodiments of the invention. The structured labeling graphical user interface may have a portion 700 for displaying statistics. The statistics may be rendered in the user-supplied tags 710 or 720 or categories. The statistics may include a numerical summary of the number of multimedia content associated with the group having the user-supplied tags 710 or 720. For instance, user-supplied tag 710 is associated with a group of 12 multimedia content and user-supplied tag 720 is associated with a group of 11 multimedia content. The statistics, in certain embodiments, may be rendered as icons representing each multimedia content. The icons may include squares or a graphic representing the file type associated with each of the multimedia content associated with the user-supplied tag or categories.

Additional information about the structured labeling graphical user interface may be found in the paper published by the inventors. Kulesza et. al., "Structured Labeling to Facilitate Concept Evolution in Machine Learning" CHI 2014 Association for Computing Machine, which is hereby incorporated by reference in its entirety.

With the benefit of the structured labeling graphical user interface a user may structure subcomponents of a concept in an open-ended manner. For instance, a user could structure the concept "AUTOS" into subcomponents like "CARS," "TRUCKS," "ADVERTISEMENTS," "REVIEWS," etc. Regardless of the subcomponent defined by the user, the structured labeling graphical user interface provides assistance to ensure that the user consistently organizes items into the defined subcomponents.

In summary, embodiments of the invention provide for automated or semi-automated grouping of data (to reduce user effort and errors). A server may generate structured labeling graphical user interfaces to assist labelers as they assign labels to multimedia content. The structured labeling graphical user interfaces may facilitate concept evolution. The server may provide a prompt for a concept in a graphical user interface. The graphical user interface may include at least two categories for the prompt and one or more user-supplied tags for groups of multimedia content within each of the two categories. The server, in turn, renders multimedia content for display to a user in a portion of the graphical user interface. The server may receive user input in the at least two categories or groups corresponding to the user-supplied tags. The server may associate the multimedia content with the at least two categories and the user-supplied tags.

In at least one embodiment, a database associated with the server may store log data that includes, among other things, user input, categories, and association between the multimedia content and the categories. The database provides a mechanism for labelers to gather statistics about the labeling tasks, speed or number of multimedia content associated with each label. The database may also allow labelers to share structured labeling data for multimedia content. The labelers may share the structured labeling data as concept definitions to other users: These definitions may be used as guidelines for other labelers (e.g., as guidelines that teach by showing examples). In alternate embodiments, sharing structured labeling data may enable multiple users to collectively define concepts and associate the multimedia content with the concepts. The database may provide corporate memory (i.e., allowing new users to continue labeling—assigning multimedia content to categories—where previous users left off).

The embodiments of the invention have been described in relation to particular embodiments, which are intended in all respects to be illustrative rather than restrictive. Alternative embodiments will become apparent to those of ordinary skill in the art to which the embodiments of invention pertains without departing from its scope. From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

The technology claimed is:

1. A computer-implemented method for multimedia content labeling, the method comprising:
    providing a plurality of multimedia content items for presentation at a graphical user interface ("GUI"), the plurality of multimedia content items comprising at least one of web pages or images;
    providing a concept prompt for presentation at the GUI, the concept prompt identifying a concept and prompting a user to indicate whether the plurality of multimedia content items are associated with the concept;
    providing a plurality of categories for presentation at the GUI, the plurality of categories having labels indicating user responses to the concept prompt;
    receiving an indication of a first user input, the first user input indicating an association between a first multimedia content item of the plurality of multimedia content items and a first category of the plurality of categories, the first category having a first label indicating a user response to the concept prompt for the first multimedia content item;
    forming a first group that is presented within the first category, the first group including the first multimedia content item;
    receiving a user-supplied tag that describes the first group and providing the user-supplied tag for presentation in association with the first group;
    determining that a second multimedia content item is uncategorized and, based on the determination that the second multimedia content item is uncategorized and on at least one of an item-to-group similarity or an item-to-item similarity, generating a suggestion that the second multimedia content item be associated with the first group within the first category, wherein the at least one of the item-to-group similarity or the item-to-item similarity is determined based on at least one of a shortest link, a cosine similarity metric, or a term frequency-inverse document frequency;
    providing the suggestion for presentation at the GUI; and
    training a machine-learning algorithm with data indicating the association between the first multimedia content item and the first category to provide an improved machine-learning algorithm.

2. The method of claim 1, wherein the labels indicating the user responses to the concept prompt comprise yes, no, and could be.

3. The method of claim 1, wherein visual indicators represent a number of multimedia content items associated with the plurality of categories and are displayed proximate to the plurality of categories.

4. The method of claim 3, wherein the visual indicators are thumbnails of the plurality of multimedia content items or icons.

5. The method of claim 3, wherein the visual indicators comprise numerical values indicating a count of the number of multimedia content items associated with the plurality of categories.

6. The method of claim 1, further comprising: providing a viewable region in the GUI with multimedia content similar to multimedia content associated with the first category.

7. The method of claim 1, wherein the first user input comprises dragging and dropping a visual representation of the first multimedia content item onto or near at least one of a visual representation of the first category or a visual representation of the user-supplied tag associated with the first group within the first category.

8. The method of claim 1, wherein the first user input comprises at least one of removing, combining, or adding user-supplied tags to the GUI.

9. The method of claim 1, further comprising:
    receiving an indication of a second user input, the second user input indicating a command to merge the first group with a second group of multimedia content items; and
    in response to receiving the indication of the second user input, merging the first group with the second group.

10. The method of claim 1, further comprising:
    storing a plurality of user input events, the plurality of categories, and the association between the first multimedia content item and the first category in a database, wherein storing the plurality of categories in the database comprises storing a number of multimedia content items associated with each of the plurality of categories and a number of multimedia content items associated with the user-supplied tag.

11. The method of claim 10, wherein storing the plurality of user input events in the database includes storing an amount of time that occurs between each of the plurality of user input events.

12. The method of claim 10, wherein the method further comprises:
    generating a summary, the summary comprising (1) a number of revisions made to user-supplied tags and (2) a number of move, combine, add, or delete inputs received for each of a plurality of groups within the plurality of categories; and
    providing the summary for output.

13. One or more computer storage devices having computer-executable instructions embodied thereon that, when executed, perform a method of generating a structured labeling graphical user interface ("GUI"), the method comprising:
    providing a concept prompt for presentation at a GUI, the concept prompt identifying a concept and prompting a user to indicate whether multimedia content items are associated with the concept, the GUI having at least two portions, a first portion for displaying the multimedia content items and a second portion for assigning the multimedia content items to one of at least two categories, the at least two categories having labels indicating user responses to the concept prompt, and each of the at least two categories including a plurality of groups that are presented within the respective category;
    based on a plurality of inputs provided by the user, associating each of the multimedia content items displayed in the first portion with a group of the plurality of groups included within one of the at least two categories in the second portion of the GUI;
    analyzing the multimedia content items associated with a first group of the plurality of groups, wherein analyzing the multimedia content items comprises determining search terms associated with the multimedia content items;
    based on the analysis, automatically generating a summary for the first group, the summary comprising at least one of the search terms as a suggested description for the multimedia content items included in the first group;
    providing the summary for output;
    based on at least one of an item-to-group similarity or an item-to-item similarity, providing a suggestion to associate an uncategorized multimedia content item with a particular group, wherein the at least one of the item-to-group similarity or the item-to-item similarity is determined based on at least one of a shortest link, a cosine similarity metric, or a term frequency-inverse document frequency; and training a machine-learning algorithm with data indicating the associations between the multimedia content items and the plurality of groups.

14. The computer storage devices of claim 13, further comprising: generating a third portion of the GUI having additional uncategorized multimedia content items that are similar to each other.

15. The computer storage devices of claim 13, wherein the at least one of the item-to-group similarity or the item-to-item similarity comprises a similarity between the uncategorized multimedia content item and a categorized multimedia content item that is associated with the particular group.

16. A computer system comprising:
one or more processors; and
computer storage memory having stored thereon computer-executable instructions that, when executed by the one or more processors, implement a method comprising:
providing a plurality of multimedia content items for presentation at a graphical user interface ("GUI");
providing a concept prompt for presentation at the GUI, the concept prompt identifying a concept and prompting a user to indicate whether the plurality of multimedia content items are associated with the concept;
providing a plurality of categories for presentation at the GUI, the plurality of categories having labels indicating user responses to the concept prompt;
receiving an indication of a first user input, the first user input indicating an association between a first multimedia content item of the plurality of multimedia content items and a first group that is presented within a first category of the plurality of categories, the first category having a first label indicating a user response to the concept prompt for the first multimedia content item;
providing a user-supplied tag for presentation in association with the first group;

based on at least one of an item-to-group similarity or an item-to-item similarity, generating a suggestion that a second multimedia content item be associated with the first group, wherein the at least one of the item-to-group similarity or the item-to-item similarity is determined based on at least one of a shortest link, a cosine similarity metric, or a term frequency-inverse document frequency;
providing the suggestion for presentation at the GUI; and
training a machine-learning algorithm with data indicating the association between the first multimedia content item and the first category.

17. The system of claim 16, wherein the method further comprises:
receiving an indication of a second user input, the second user input indicating a command to move the first group from the first category to a second category of the plurality of categories, the first category comprising a maybe category and the second category comprising a yes category; and
in response to the indication of the second user input, moving the first group from the first category to the second category.

18. The system of claim 16, wherein the method further comprises:
generating a summary, the summary comprising a number of user-provided revisions received for user-supplied tags and a number of user-provided commands associated with a plurality of groups included within the plurality of categories, the user-provided commands comprising move, merge, add, and delete commands; and
providing the summary for output.

19. The computer storage devices of claim 13, wherein determining the search terms associated with the multimedia content items comprises:
accessing a search query log comprising search queries that returned the multimedia content items; and
extracting the search terms from the search queries.

20. The computer storage devices of claim 13, wherein analyzing the multimedia content items associated with the first group comprises determining the most frequently occurring terms associated with the multimedia content items.

* * * * *